United States Patent [19]

Schmidt

[11] Patent Number: 5,178,040
[45] Date of Patent: Jan. 12, 1993

[54] TOOL TURRET FOR MACHINE TOOLS

[75] Inventor: Rudolf Schmidt, Reichenbach/Fils, Fed. Rep. of Germany

[73] Assignee: EMAG Maschinenfabrik GmbH, Salach/Württ, Fed. Rep. of Germany

[21] Appl. No.: 575,972

[22] Filed: Aug. 31, 1990

[30] Foreign Application Priority Data

Sep. 1, 1989 [DE] Fed. Rep. of Germany ....... 3929136

[51] Int. Cl.$^5$ ............................................. B23B 29/24
[52] U.S. Cl. .................... 74/813 L; 74/813 R; 74/820
[58] Field of Search ......... 74/813 R, 813 L, 815–820; 29/39–47

[56] References Cited

U.S. PATENT DOCUMENTS

| | | | |
|---|---|---|---|
| 3,007,345 | 11/1961 | Hider | 74/820 X |
| 3,590,661 | 7/1971 | Roger | 74/820 |
| 4,080,849 | 3/1978 | Benjamin et al. | 74/813 R |
| 4,858,290 | 8/1989 | Hirose et al. | 74/820 X |
| 4,944,198 | 7/1990 | Natale et al. | 74/813 L X |

FOREIGN PATENT DOCUMENTS

| | | | |
|---|---|---|---|
| 1602902 | 5/1970 | Fed. Rep. of Germany | 74/813 R |
| 3143983 | 6/1982 | Fed. Rep. of Germany | 74/813 R |
| 3730561 | 11/1988 | Fed. Rep. of Germany | 74/813 R |

*Primary Examiner*—Vinh T. Luong
*Attorney, Agent, or Firm*—McAulay Fisher Nissen Goldberg & Kiel

[57] ABSTRACT

The tool turret comprising driven tools comprises a turret shaft (2) which carries the turret plate (4) and is supported in a turret housing (1) so as to be rotatable and axially displaceable. The turret shaft (2) can be locked at the turret plate end by a Hirth coupling. At the other end, the turret shaft (2) can be connected via a switchable coupling with a toothed wheel (23) of a gear unit (15) so as to be fixed with respect to rotation relative to it, the toothed wheel (23) being supported coaxially relative to the turret shaft (2). A switchable intermediate wheel (26), which engages with a pinion (27) of a drive shaft (28) for the tools to be driven, can engage with the coaxial toothed wheel (23). The turret shaft (2) can be displaced axially into its two end positions by a double-action piston (6), the couplings (12, 13) connected with the turret shaft (2) being alternately engaged and disengaged in the two end positions. For the purpose of swiveling the turret plate, the turret shaft (2) is connected with the coaxial toothed wheel (23) via the coupling (24, 25) so as to be fixed with respect to rotation relative to it, whereas the switching wheel (26) is disengaged from the coaxial toothed wheel (23). In order to drive the drive shaft (28), the turret shaft (2) is separated from the coaxial toothed wheel (23) which now engages with the intermediate wheel (26).

13 Claims, 5 Drawing Sheets

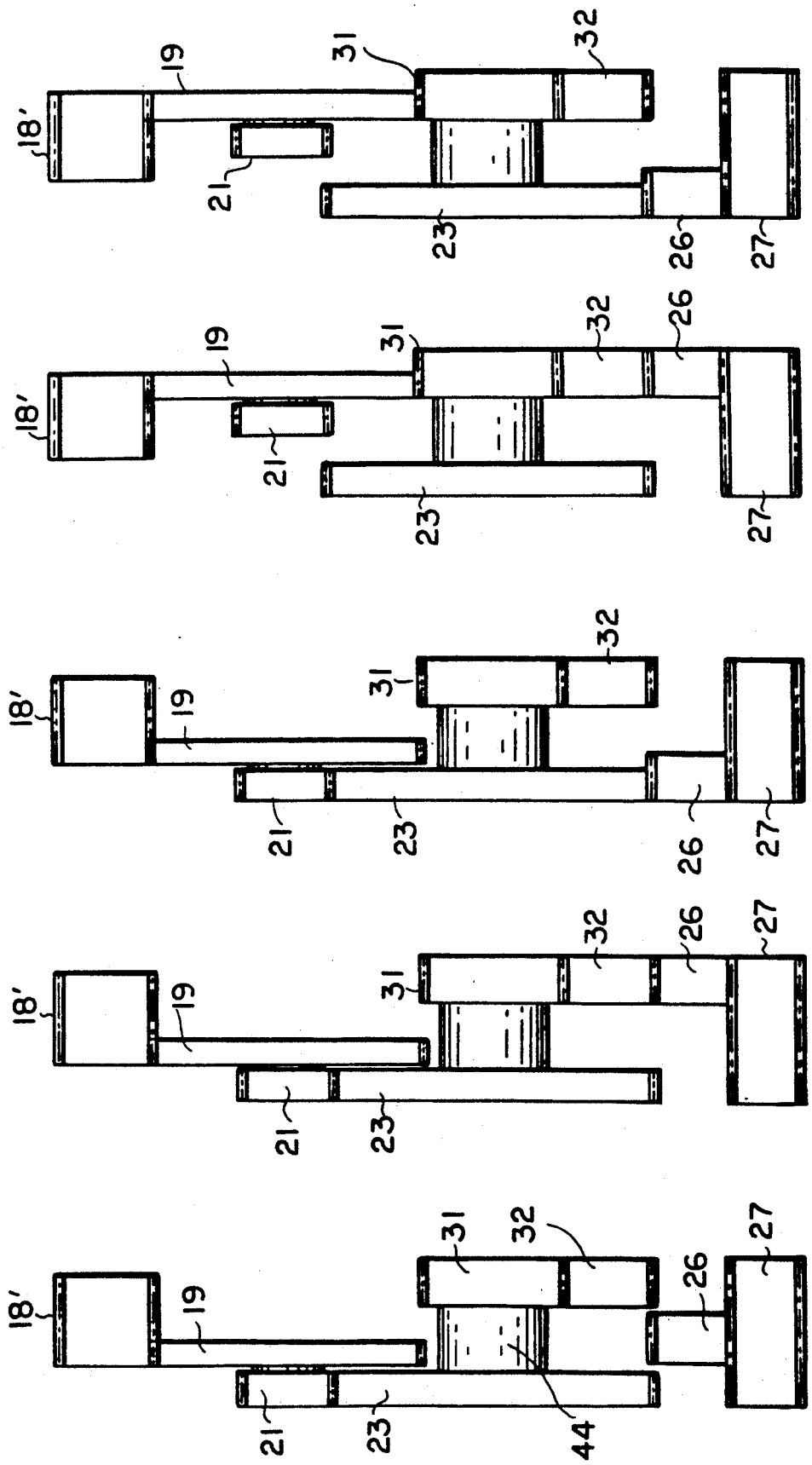

TOOL TURRET FOR MACHINE TOOLS

BACKGROUND OF THE INVENTION

1. Field of the Invention

The invention is directed to a tool turret for machine tools with driven tools, the turret plate of the tool turret being arranged at a turret shaft, which is rotatably supported in the revolver housing, and the turret plate can be brought into and secured in different rotational angle positions in which the respective tool is coupled with a drive shaft, wherein a gear unit is provided at the turret housing at the side remote of the turret plate, which gear unit is drivable by a motor and comprises a toothed wheel which is rotatably supported coaxially relative to the turret shaft and, on one hand, can be connected with the turret shaft so as to be fixed with respect to rotation relative to it by means of a switchable coupling and, on the other hand, communicates with a pinion of the drive shaft for the tools by means of a subsequently arranged intermediate toothed wheel driving the tool.

2. Description of the Prior Art

In a known tool turret of this kind (DE-PS 37 30 561), the possibility is provided to drive the turret plate or the tool, as desired, on the basis of a motor; but there is no possibility of driving the tools at different speeds. This possibility is provided in principle in another tool turret (DE-OS 16 02 902), but separate drive motors and separate gear trains, which increase the expenditure on construction and the space requirement, are necessary for this purpose.

SUMMARY OF THE INVENTION

It is the object of the invention to construct a tool turret of the type mentioned in the beginning in such a way that the turret plate can be swiveled and the tools can also be driven with one and the same conventional drive motor of the tool turret, wherein a high torque is available for the swiveling of the turret plate and different speeds are available for driving the tools.

This object is met, according to the invention, in that the gear unit comprises two gear trains extending parallel to one another and continuously driven by the motor, in that the intermediate toothed wheel is switchable, and in that the drive shaft can be coupled with one of the gear trains, as desired, by means of the switchable intermediate wheel.

This construction makes it possible not only to drive the turret plate at a low speed and with high torque and to drive the tools at a substantially higher speed, but also to drive the tools at different speeds, because the toothed wheels of the two gear trains, which are continuously driven by the motor, can be dimensioned differently corresponding to the desired speeds. The space requirement is small due to the use of a single motor which continuously drives the two gear trains.

A particularly advantageous construction of the invention is provided in that the turret shaft is supported so as to be axially displaceable and can be displaced into two end positions by means of a double-action piston fastened to it, in that one part of a Hirth coupling is securely arranged at the unit comprising the turret shaft and turret plate, the other part being fastened at the turret housing, in that a toothed wheel with external toothing is fastened on the turret shaft and a toothed wheel which comprises an inner toothing and fits in the latter toothed wheel is fastened at the coaxial toothed wheel of the gear unit, wherein the toothed wheel on the turret shaft and the toothed wheel at the coaxial toothed wheel form the switchable coupling, in that the two toothed wheels of the switchable coupling engage and the two parts of the Hirth coupling disengage during the axial displacement of the turret shaft into the first end position, and the toothed wheels of the switchable coupling disengage and the parts of the Hirth coupling engage during the displacement into the second end position, and in that the switchable intermediate wheel can be disengaged from the coaxial toothed wheel by means of a switching device when the turret shaft is located in the first end position and can be engaged with the coaxial toothed wheel when the turret shaft is located in the second end position.

As a result of the axial displaceability of the turret shaft it is possible, by means of only a single double-action piston, to engage the parts of the Hirth coupling in order to fix the turret plate in a determined rotational angle position and to simultaneously cancel the flow of force from the drive motor to the turret shaft on the one hand and, on the other hand, to disengage the Hirth coupling during the coupling of the turret shaft to the gear unit. It is particularly advantageous that the separation of the Hirth coupling and the coupling of the turret shaft to the gear unit are effected simultaneously in a compulsory manner, since the two couplings communicate with the turret shaft and the actuation of these couplings depends on the axial displacement of the turret shaft, so that it is ensured that the turret shaft cannot be driven when the turret plate is fixed in a determined rotational angle position.

In another construction of the invention, the switching device for the switchable intermediate wheel can comprise a double-action cylinder/piston unit and a switching fork which is connected with the piston and acts at the intermediate wheel which is guided so as to be displaceable on an intermediate shaft which is arranged subsequent to the coaxial toothed wheel.

According to an advantageous construction of the invention, the gear unit comprises a drive pinion which is arranged on the motor shaft and an intermediate shaft or countershaft which is connected prior to the coaxial toothed wheel, two toothed wheels being arranged on the countershaft so as to be fixed with respect to rotation relative to it, the first of these toothed wheels meshing with the drive pinion and the second with the coaxial toothed wheel, in that the first toothed wheel drives another gear train whose final or last toothed wheel can engage with the switchable intermediate wheel. This gear unit construction enables the drive shaft for tools to be driven at two different speeds, wherein the switchable intermediate wheel meshes with the coaxial toothed wheel for one drive speed and with the last wheel of the other gear train for the other drive speed after the disengagement of the turret shaft from the gear unit, wherein the other gear train is, of course, designed in such a way that the gear ratio is different from that during the force flow via the coaxial toothed wheel.

In order to enable a compact construction of the gear unit, it is advantageous if, in another embodiment of the invention, a first toothed wheel of the other gear train meshing with the first toothed wheel of the countershaft is arranged on a shaft and that the coaxial toothed wheel is also arranged on the shaft. Accordingly, not only is less space required for the gear unit, but another bearing shaft for the first toothed wheel of the other gear train is dispensed with. The first toothed wheel of the other gear train is supported on the shaft so as to be freely rotatable in a first construction.

A particularly advantageous construction of the invention which allows a number of speeds for the drive shaft of the tools is provided in that the toothed wheels on the countershaft are jointly displaceable on the latter by means of a switching device, wherein the second toothed wheel engages with the coaxial toothed wheel and the first toothed wheel disengages from the first toothed wheel of the second gear train in the first end position, whereas, in the second end position, the first toothed wheel of the countershaft engages with the first toothed wheel of the second gear train and the second toothed wheel of the countershaft disengages from the coaxial toothed wheel, wherein the coaxial toothed wheel of the first gear train is connected with the first toothed wheel of the other gear train, with which the first toothed wheel of the countershaft can engage, so as to be fixed with respect to rotation relative to it. Accordingly, in addition to the swiveling of the turret plate, four speeds can be shifted in combination with the switchable intermediate wheel. The magnitude of the individual toothed wheels of the two parallel gear trains can be selected in such a way that, at the first speed with the lowest drive speed, the second toothed wheel of the countershaft engages with the coaxial toothed wheel and the switchable intermediate wheel meshes with the last toothed wheel of the other gear train. At the next highest speed, the second toothed wheel of the countershaft engages with the coaxial toothed wheel with which the switchable intermediate wheel also meshes. At the third speed, the first toothed wheel of the countershaft is connected with the first toothed wheel of the other gear train, wherein the switchable intermediate wheel meshes with the last toothed wheel of the other gear train. Finally, at the fourth speed, the first toothed wheel of the countershaft engages with the first toothed wheel of the other gear train, whereas the switchable intermediate wheel is connected with the coaxial toothed wheel.

Since the drive shaft can have different rotating directions depending on the number of toothed wheels in the two gear trains, it is advantageous if the rotating direction of the motor is reversible in another embodiment of the invention.

If the gear unit is fastened in a separate gear housing at the turret housing so as to be detachable in a further embodiment of the invention, the advantageous possibility is provided of utilizing this gear unit for supplementing existing tool turrets so as to realize the advantages of the invention with relatively low expenditure.

If a rotation detector is connected with the turret shaft in a further embodiment of the invention, the advantage is provided that the rotational angle position of the turret plate is adjustable by means of this without high expenditure on regulating means for the drive motor.

Even if a rotation detector is also connected with the drive shaft for the tools, considerable advantages can accordingly be achieved in the machining of the workpieces, since the reciprocal position of the tool with reference to the workpiece can accordingly be exactly adjusted and is reproducible.

BRIEF DESCRIPTION OF THE DRAWINGS

The invention is explained in more detail in the following with the aid of embodiment examples shown in the drawing.

FIGS. 6 to 10 show different switching positions of a gear unit with a number of speeds.

DESCRIPTION OF THE PREFERRED EMBODIMENTS

Figure 1:
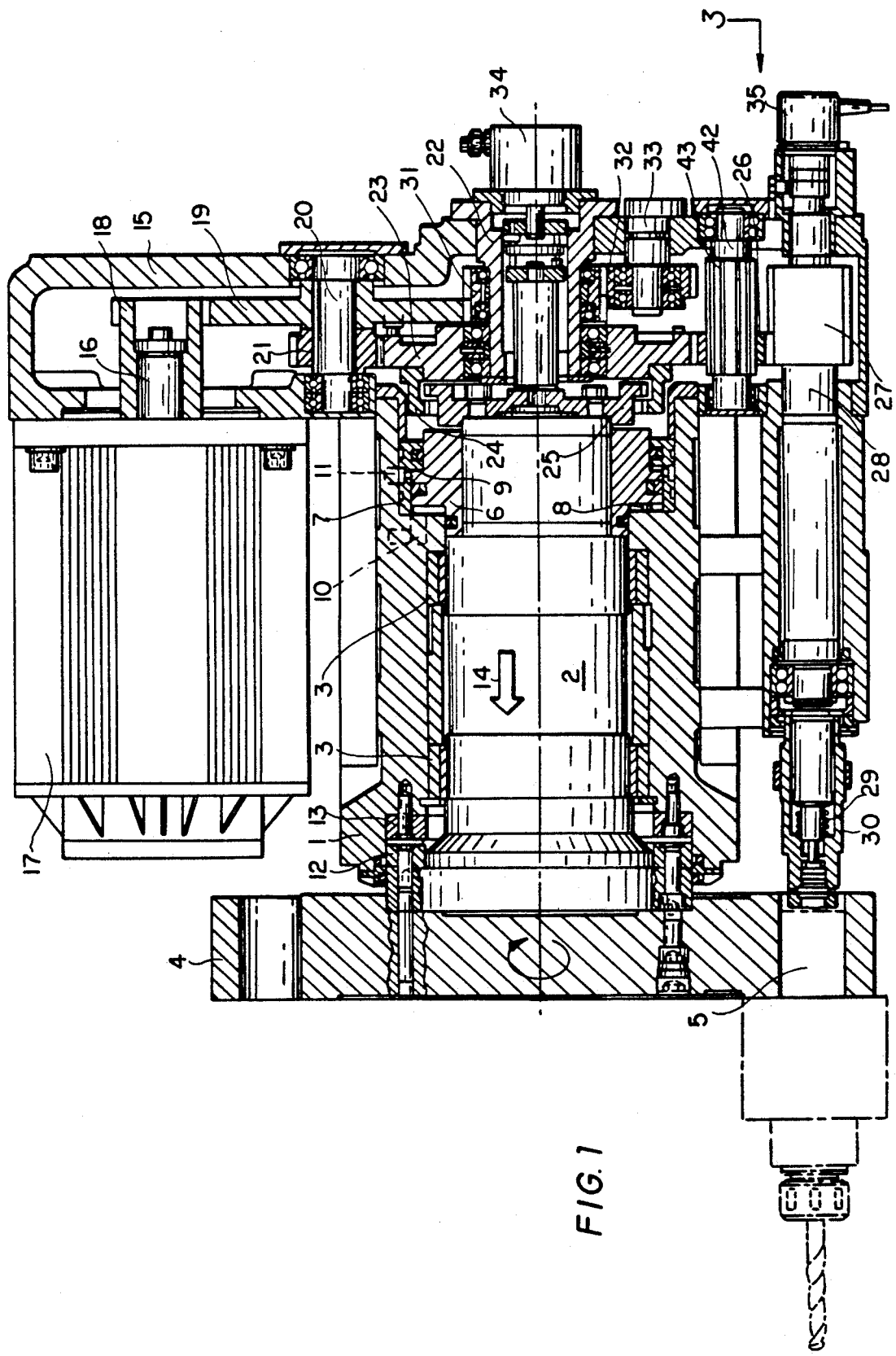
FIG. 1 shows a section through a two-speed tool turret with flanged on housing, wherein the Hirth coupling is in the engaged position.

As can be seen from FIG. 1, a turret shaft 2 is supported in bearings 3 in a turret housing 1 so as to be rotatable and axially displaceable. A turret plate 4, which comprises a plurality of receptacles 5 for drivable tools distributed along the circumference, is fastened at the end of the turret shaft 2 projecting out of the turret housing 1.

For the purpose of the axial displacement of the turret shaft 2, a piston 6 is fastened on the latter, its assigned cylinder being designated by 7. The piston 6 is constructed as a step piston and comprises a greater effective surface 8 and a smaller effective surface 9 to which a pressure medium can be supplied via lines 10 and 11.

The turret shaft 2 is connected at the end facing the turret plate 4 with a part 12 of a Hirth coupling 12, 13 whose counterpart 13 is fastened at the turret housing 1. In the shown position, the Hirth coupling is engaged, so that the turret plate 4 is fixed in a determined rotational angle position. In order to reach this position, pressure medium is supplied to the larger effective surface 8 of the piston 6 via the line 10, so that the turret shaft is pushed in the axial direction into the position shown in FIG. 1. If pressure medium is supplied to the smaller effective surface 9 of the piston 6 via the line 11, the turret shaft is moved out of the shown position in the direction of arrow 14, so that the two parts 12 and 13 of the Hirth coupling disengage, so that the turret shaft 2 can be swiveled into another rotational angle position with the turret plate 4.

A gear unit housing 15 is detachably fastened at the side of the turret housing 1 remote of the turret plate 4 by means of screws. The motor shaft 16 of a drive motor 17 which is arranged on the turret housing 1 projects into this gear unit housing 1. The drive shaft 16 carries a drive pinion 18 which meshes with a first toothed wheel 19 which is arranged on a countershaft 20 so as to be fixed with respect to rotation relative to the latter, a second toothed wheel 21 likewise being arranged on the latter so as to be fixed with respect to rotation relative to it. The second toothed wheel 21 of the countershaft 20 meshes with a toothed wheel 23 which is supported on a shaft 22 coaxially relative to the turret shaft 2 so as to be freely rotatable. This toothed wheel 23 is securely connected at the side facing the turret housing 1 with a toothed wheel 24 having an inner toothing. This toothed wheel 24 can engage with a toothed wheel 25 having an external toothing which is fastened at the end of the turret shaft 2. In the shown position, according to FIG. 1, these two toothed wheels are disengaged. If the turret shaft 2 is displaced in the direction of the arrow 14 by means of the piston 6, the toothed wheels 24 and 25 mesh in one another. These two toothed wheels form a switchable coupling which can produce a rotationally locking connection between the turret shaft 2 and the coaxial toothed wheel 23.

The coaxial toothed wheel 23 can engage with a switchable intermediate wheel 26 which is arranged subsequent to the coaxial toothed wheel 23 in the direction of the flow of force. This intermediate wheel 26 engages with a pinion 27 of a drive shaft 28. The drive shaft 28 reaches up to the turret plate 4 and is equipped at the end facing the turret plate 4 with a coupling piece 30 for driving tools which are inserted in the respective receptacle 5, the coupling piece 30 being spring-suspended by means of a spring 29. The rotational angle positions of the turret plate 4 are fixed in such a way that the axis of the receptacle 5 is exactly aligned with the axis of the drive shaft 28 in order to enable a cooperation of the coupling 30 with the respective tool.

The gear unit also comprises another gear train which comprises two toothed wheels 31 and 3 in the shown embodiment example. The toothed wheel 31 is supported on the shaft 22 so as to be freely rotatable and engages with the first toothed wheel 19 of the countershaft 20. This first toothed wheel 31 of the other gear train is connected with the second or last toothed wheel 32 of this gear train. This toothed wheel is supported on an axle journal 33 in a position such that the switchable intermediate wheel 26 can be connected with this last toothed wheel 32 of the other gear train. This switching position is indicated in FIGS. 4a-c and 5 by dashed lines. The pinion 27 is constructed so as to be wide enough in the axial direction that an engagement with the pinion 27 persists also in this switching position of the intermediate wheel 26.

A rotation detector 34 is arranged at the end of the turret shaft 2 remote of the turret plate 4 for the purpose of accurately fastening the rotational angle position of the turret plate 4. Another rotation detector 35 is arranged at the end of the drive shaft 28 remote of the coupling 30 in order to be able to determine the exact position of the tool.

The switching mechanism for the switchable intermediate wheel 26 can be seen in FIGS. 4a-c and 5. This switching mechanism comprises a cylinder 36 which is fastened at the gear housing 15 and comprises a double-action piston 37 whose piston rod 38 is securely connected via a rigid connection bracket 39 with a switching rod 40 which is guided in the gear housing 15 so as to be displaceable. A switching fork 41 is fastened on this switching rod 40; the switching fork 41 cooperates with the switchable intermediate wheel 26 and, during the displacement of the piston 37 into the various switching positions, displaces the intermediate wheel 26 on a shaft 42 which is rotatably supported in the gear housing 15 and is provided with a wedge section 43 which cooperates with a corresponding wedge section in the intermediate wheel 26, so that the latter is arranged on the shaft 42 so as to be fixed with respect to rotation, but displaceable, relative to it.

The described arrangement operates in the following manner: When the turret shaft 2 is located in the position shown in FIG. 1, the two parts 12 and 13 of the Hirth coupling engage with one another and the two toothed wheels 24 and 25 of the switchable coupling are disengaged. In this position, the turret plate 4 is fixed in its adjusted rotational angle position. When the motor 17 drives the first toothed wheel 19 of the countershaft 20 by means of a pinion 18, the second toothed wheel 21 meshing with the toothed wheel 23, which is supported on the shaft 22 so as to be freely rotatable, is also driven due to the fact that the two toothed wheels 19, 21 are connected with the countershaft 20 so as to be fixed with respect to rotation relative to it. In the position of the switchable intermediate wheel 26 shown in FIG. 1, the toothed wheel 23 drives the latter 26, which engages with the pinion 27 on the drive shaft 28, so that the shaft 28 is driven and a tool received in the receptacle 5 can accordingly be driven. If the intermediate wheel 2 is brought into the switching position shown in FIG. 4c, the flow of force proceeds from the drive pinion 18 via the first toothed wheel 19 and the first toothed wheel 31 of the other gear train to the last toothed wheel 32 of this gear train which meshes with the intermediate wheel 26 after the latter is switched into the position shown in dashed lines. In this switching position, the drive shaft achieves a substantially greater speed than in the previously described switching position, which is a result of the different magnitude of the toothed wheels of the other gear train relative to the first gear train. Since the toothed wheel 19 is greater than the toothed wheel 31, the speed of the latter is greater than that of the toothed wheel 19. Since the toothed wheel 31 which meshes with the toothed wheel 32 is greater than the latter, the speed is further increased. In the first gear train, on the other hand, the speed of the countershaft 20 is first reduced to slow speed by means of the engagement of the second toothed wheel 21 in the coaxial toothed wheel 23, which is substantially greater than the second toothed wheel 21. This speed is geared up again by means of the engagement of the toothed wheel 23 in the switchable intermediate wheel 26, which is substantially smaller than the toothed wheel 23, but this speed is lower than that during the flow of force via the other gear train explained in the preceding.

When the turret shaft 2 is displaced into its second end position in the direction of the arrow 14 by means of the piston 6, the two parts 12 and 13 of the Hirth coupling disengage, so that the turret shaft 2 is freely rotatable together With the turret plate 4. In this position, shown in FIG. 2, the toothed wheels 24 and 25, which form a switchable coupling, mesh. In this switching position, the flow of force proceeds from the drive pinion 18 via the first toothed wheel 10 of the countershaft 20 and drives the latter. Since the second wheel 21 is arranged on the countershaft 20 so as to be fixed with respect to rotation relative to it, it drives the toothed wheel 23 which is arranged coaxially relative to the turret shaft 2. Since this toothed wheel 23 is connected, via the toothed wheels 24 and 25, with the turret shaft 2 so as to be fixed with respect to rotation relative to it, the latter 2, and accordingly also the turret plate 4, are driven. Since the drive pinion 18 is substantially smaller than the first toothed wheel 19 and the second toothed wheel 21 is likewise substantially smaller than the coaxial toothed wheel 23, the speed of the motor shaft 16 is geared down very sharply, so that the desired rotational speed is available with a very high torque for the swiveling of the turret plate 14. During this process, the switchable intermediate wheel 26 must be brought into an intermediate position on the shaft 42, specifically between the toothed wheel 23 and the toothed wheel 32, so that the flow of force to the drive shaft 28 is interrupted.

Figure 2:
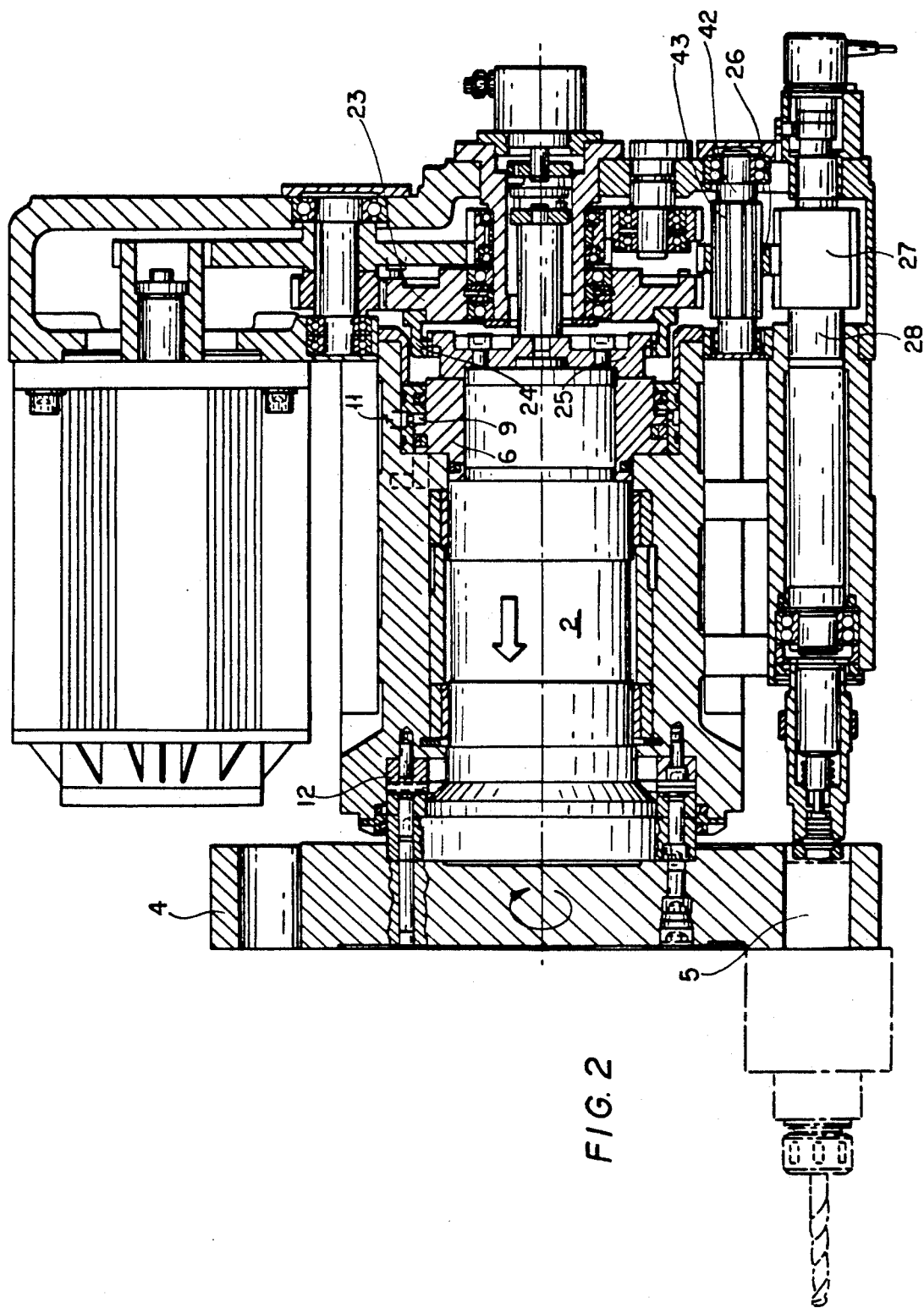
FIG. 2 shows the two-speed tool turret of FIG. 1, with the Hirth coupling disengaged.
Figure 4A:
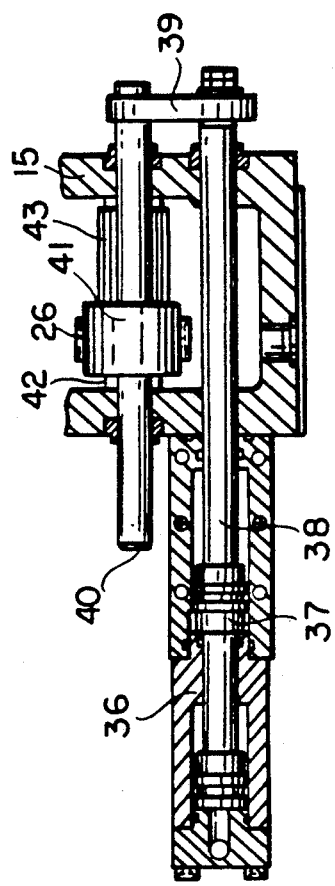
FIGS. 4a, 4b, and 4c shows a series of partial section according to the line III-III in FIG. 3, and illustrate the range of displacement of the intermediate wheel 26.
Figure 4B:
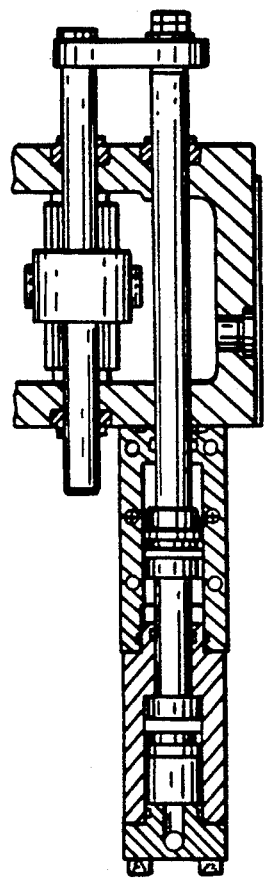
Figure 4C:
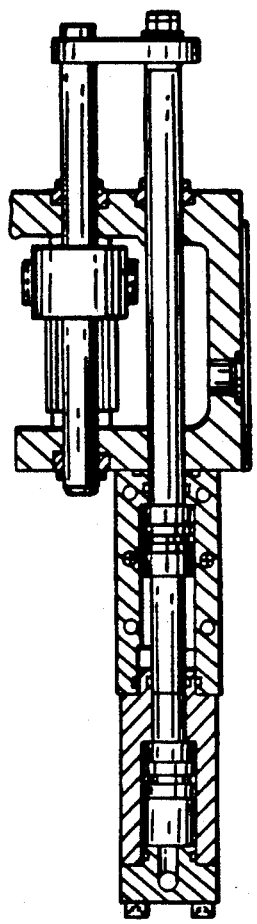
Figure 3:
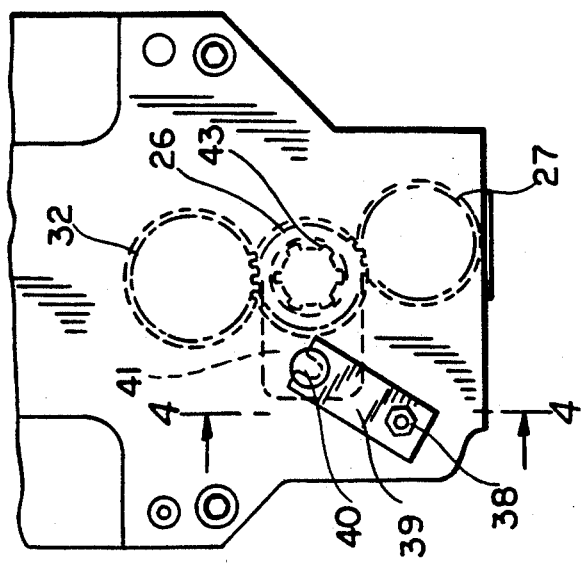
FIG. 3 shows a partial view of the tool turret in the direction of the arrow II in FIG. 1.

A second embodiment, having four speeds, will now be discussed. Different switching positions of a gear unit which is modified compared to FIG. 1 are shown in FIGS. 6 to 10. Identical parts are provided with the same reference numbers and comparable parts are provided with the same reference numbers accompanied by the symbol '. The substantial difference compared with the gear unit according to FIGS. 1 and 2 is two-fold. The first difference consists in that the toothed wheels 19 and 21 are displaceable jointly on the countershaft 20, wherein the drive pinion 18' is constructed so as to be wide enough in the axial direction (compare FIGS. 6-10) that a continuous engagement persists between the drive pinion 18' and the first toothed wheel 19 in spite of the displacement possibility. The two end positions are shown in FIGS. 6 to 8 on one hand and in FIGS. 9 and 10 on the other hand.

The second difference with respect to the gear unit according to FIG. 1 consists in that the toothed wheels 23 and 31 are connected with one another so as to be fixed with respect to rotation relative to one another.

Figure 5:
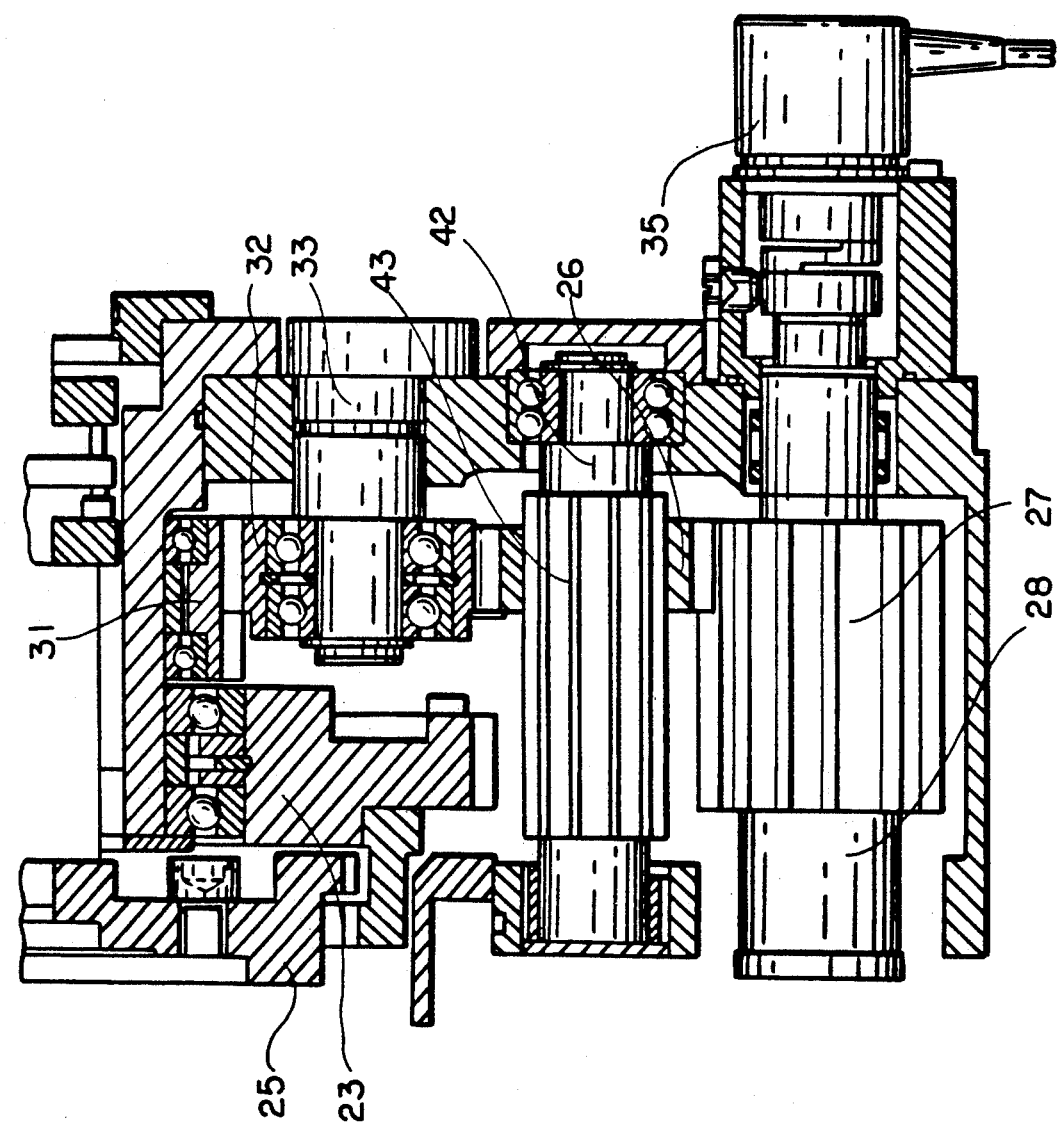
FIG. 5 shows an isolated view of the switching position of the intermediate wheel 26 corresponding to FIG. 4c.

In the switching position shown in FIG. 5, the flow of force proceeds from the drive pinion 18' via the first toothed wheel 19 and the toothed wheel 21, which is connected with the latter so as to be fixed with respect to rotation relative to it, to the toothed wheel 23 which, in this switching position, is connected via the coupling 24, 25 seen in FIG. 1 with the turret shaft 2 so as to be fixed with respect to rotation relative to the latter 2. The switchable intermediate wheel 26 is located between the toothed wheels 21 and 32, so that the flow of force to the pinion 27, and accordingly to the drive shaft 28, is interrupted. This is the switching position for the swiveling of the turret plate 4.

The gear unit design is selected in such a way that higher speeds of the pinion 27, and accordingly of the drive shaft for the tools which is connected with it, result from different switching positions proceeding from FIGS. 7 to 10.

FIG. 7 shows the switching position producing the lowest speed of the pinion 27. In this position, the toothed wheel pair 19, 21 is displaced in such a way that the toothed wheel 21 meshes with the toothed wheel 23. The flow of force then proceeds further via the toothed wheel 31 which is connected, via an intermediate piece 44, with the toothed wheel 23 so as to be fixed with respect to rotation relative to the latter, to the toothed wheel 23 meshing with the intermediate wheel 26 which is connected continuously with the pinion 27.

In the switching position according to FIG. 8, which differs from that according to FIG. 7 only in that the intermediate wheel 26 meshes with the toothed wheel 23, the flow of force proceeds from the drive pinion 18' via the toothed wheel pair 19, 21 to the toothed wheel 23 and from there via the intermediate wheel 26 to the pinion 27.

The next speed is produced by the switching position according to FIG. 9. In this switching position, the toothed wheel pair 19, 21 is displaced into its other end position, so that the toothed wheel 19 engages with the first toothed wheel 31 of the other gear train. In the switching position according to FIG. 9, the intermediate wheel 26 engages with the last toothed wheel 32 of the other gear train, so that the flow of force proceeds from the drive pinion 18' via the first toothed wheel 19 and the toothed wheels 31 and 32 of the other gear train to the intermediate wheel 26 and from there to the pinion 27.

The switching position according to FIG. 10 enables the highest speed. In this instance, the toothed wheel pair 19, 21 is located in the same switching position as in FIG. 9, but the intermediate wheel 26 engages with the toothed wheel 23. The flow of force now proceeds from the drive pinion 18' via the toothed wheel 19 to the toothed wheel 31, which latter 31 likewise sets the toothed wheel 23 in rotation because it is connected with the latter so as to be fixed with respect to rotation relative to it. The flow of force is then effected from the toothed wheel 23 to the intermediate wheel 26 and from the latter to the pinion 27.

I claim:

1. A tool turret for driving tools comprising:
   (1) a turret plate assembly comprising:
      (a) a turret shaft having disengageable coupling means at one end;
      (b) a turret plate rotatably coupled to said turret shaft through said disengageable coupling means; and,
      (c) rotation engagement means at the other end of said turret shaft;
   (2) a tool driving assembly comprising:
      (a) a drive shaft;
      (b) tool connecting means rotatably connected to said drive shaft; and,
      (c) drive engagement means at the other end of said drive shaft; and,
   (3) driving means for engaging said rotation engagement means and said drive engagement means comprising:
      (a) a motor;
      (b) a rotation engagement drive train rotatably coupling said motor and said rotation engagement means;
      (c) a multiple speed drive engagement drive train rotatably coupling said motor and said driving means comprising:
         (i) a single speed drive train; and
         (ii) a switchable intermediate toothed wheel for independently and rotatably coupling said single speed drive train to said drive engagement drive train.

2. The tool turret of claim 1, wherein said disengageable coupling means comprises:
   (1) a two-gear unit Hirth coupling, wherein the first gear unit is fixed at said turret plate and the second gear unit is engageable by one end of said turret shaft; and,
   (2) a double-action piston connected to said turret shaft making it axially displaceable for engaging and disengaging said Hirth coupling.

3. The tool turret of claim 1, wherein said switchable intermediate toothed wheel comprises:
   (1) a shaft;
   (2) a toothed wheel, axially moveable along and rotatably connected to said shaft; and,
   (3) a double action piston connected to said toothed wheel for moving and fixing said wheel axially along said shaft.

4. The tool turret of claim 1, wherein said multiple speed drive engagement drive train is a two speed drive train.

5. The tool turret of claim 1, wherein said driving means further comprises:
   (1) a pinion rotatably connected to said motor;
   (2) a first toothed wheel connected to a countershaft and rotatably meshing with said pinion, wherein said first toothed wheel drives a first speed drive train; and (3) a second toothed wheel connected to said countershaft drives a said second speed drive train.

6. The tool turret of claim 5, wherein:

(1) said first speed drive train comprises a third toothed wheel connected to a second shaft which engages said first toothed wheel, and wherein said third toothed wheel may engage said switching toothed wheel and, (2) said second speed drive train comprises a fourth wheel connected to said second shaft which meshes with said second wheel and a fifth wheel connected to an axle journal, and wherein said fifth wheel may engage said switching toothed wheel.

7. The tool turret of claim 6, wherein said fourth wheel is freely rotatable with respect to said second shaft.

8. The tool turret of claim 5 or 6, wherein said first and second toothed wheels are jointly displaceable on said countershaft into four positions by means of a switching device, wherein:

(1) said first position comprises said first toothed wheel engaging said first speed drive train while, simultaneously, said second toothed wheel is disengaged;

(2) said second position comprises said second toothed wheel engaging said second speed drive train while, simultaneously, said first toothed wheel is disengaged;

(3) said third position comprises said second toothed wheel engaging said first speed drive train while simultaneously, said first toothed wheel is disengaged; and, (4) said fourth position comprises said first toothed wheel engaging said second speed drive train while, simultaneously, said second toothed wheel is disengaged.

9. The tool turret of claim 1, wherein the rotating direction of said motor is reversible.

10. The tool turret of claim 1, wherein said driving means is detachably fastened in a gear housing.

11. The tool turret of claim 1, wherein a rotation detector is connected to said turret shaft.

12. The tool turret of claim 1, wherein a rotation detector is connected to said drive shaft.

13. The tool turret of claim 1, wherein said multiple speed drive engagement drive train is a four speed drive train.

* * * * *